United States Patent [19]
Labedan

[11] Patent Number: 5,263,780
[45] Date of Patent: Nov. 23, 1993

[54] PRESTRESSED ROLLING BEARING

[75] Inventor: Jean-Denis Labedan, Bourges, France

[73] Assignee: Nadella, Vierzon, France

[21] Appl. No.: 788,040

[22] Filed: Nov. 5, 1991

[30] Foreign Application Priority Data

Nov. 8, 1990 [FR] France .................... 90 13854

[51] Int. Cl.⁵ .............................................. F16C 27/06
[52] U.S. Cl. ................................... 384/611; 384/615
[58] Field of Search ............... 384/611, 614, 615, 616, 384/620, 505

[56] References Cited

U.S. PATENT DOCUMENTS 3,554,621  1/1971  McAllister .

FOREIGN PATENT DOCUMENTS 2032111  1/1971  Fed. Rep. of Germany .
890552  11/1943  France .
2628160  9/1989  France .
2147957  5/1985  United Kingdom .

Primary Examiner—Lenard A. Footland
Attorney, Agent, or Firm—Emmanuel J. Lobato; Robert Burns

[57] ABSTRACT

The rolling bearing comprises a ring (30) made in two relatively axially movable ring parts (31,32) and another ring or shaft (40) between which rolling elements (20) travel, and an elastically yieldable device (50) cooperative with a housing and one of said ring parts and capable of being placed in a first state corresponding to an inactive prestress and a second state corresponding to an active prestress. This elastically yieldable device (50) comprises a support (51) in the form of a split washer (5100), a detent mechanism (521) with at least two projecting lugs (5212) and an elastomeric collar-shaped element (53).

7 Claims, 2 Drawing Sheets

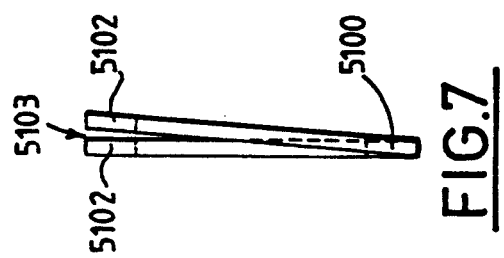
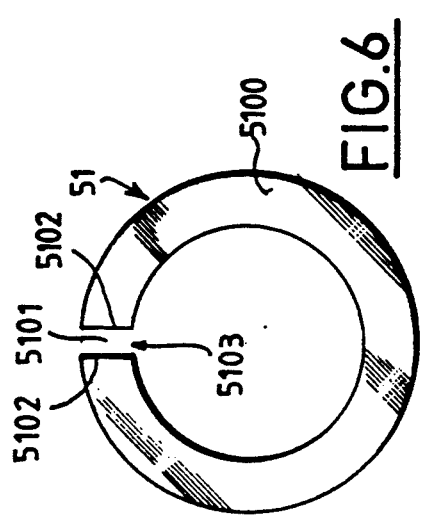
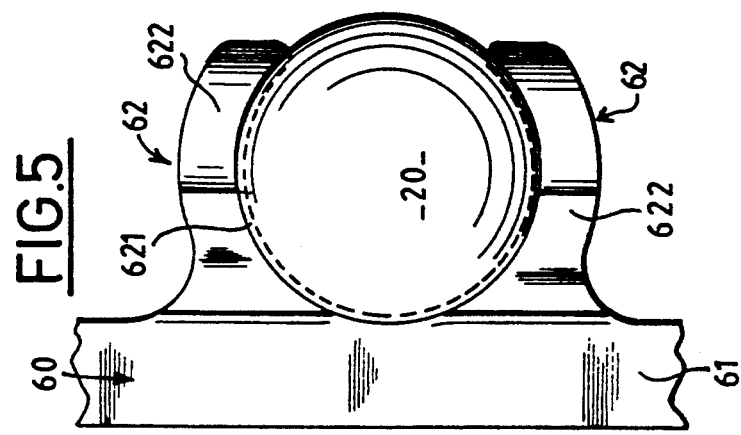
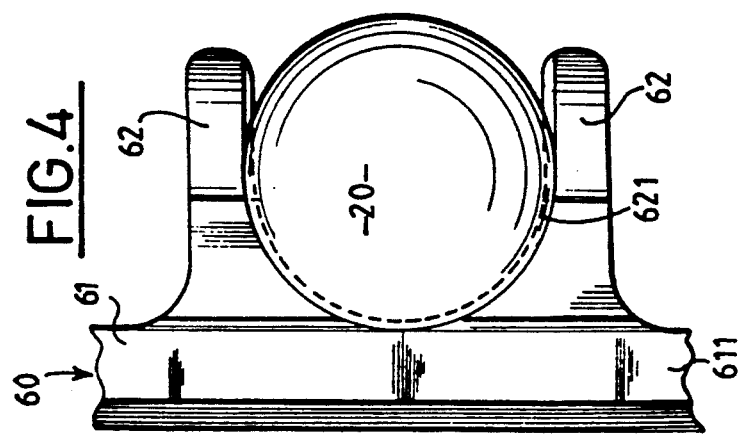

PRESTRESSED ROLLING BEARING

The present invention relates to prestressed rolling bearings, in particular ball bearings, and more particularly to those in which the prestress is adjustable between a first value to permit maintaining the rolling elements in the non-mounted state of the bearing and mounting the latter, and a second value in respect of which the prestress is that required for a good operation.

Prestressed rolling bearings are well known in the art.

Among these prestressed rolling bearings, some are of the type in which at least one of the rings is divided into two parts which are freely movably mounted one inside the other for transmitting the prestress. A rolling bearing of this type is for example disclosed in the French patent application 2 594 189.

All the advantages afforded by this type of rolling bearing are known. It permits automatically taking up play and is self-centring and self-adapting with respect to the prestress.

However, while this type of rolling bearing is satisfactory in many applications, it is difficult to use. This is in particular the case when the male member and/or the female member between which this rolling bearing is intended to be placed is of such nature that this member may itself directly serve as one of the bearing rings of the rolling bearing.

In such a case, the qualities of this member, possibly after having received a suitable treatment, for example a heat treatment, render it suitable for use directly as a contact raceway along which the rolling elements, such as balls, roll. In such a situation, the mounting presents specific problems, since the prestress temporarily increases upon assembly and the mounting and operating characteristics are then often incompatible. Indeed, if the mounting conditions are satisfied so that the mounting is relatively easy, there is a danger of the rolling bearing spontaneously coming apart under the effect of a force having an axial component opposite that of the mounting and security of maintained assembly of the component parts is not ensured. On the other hand, if the operating conditions are satisfied and security of maintained assembly is ensured, the force required for mounting is considerable and beyond those commonly acceptable or employed.

To overcome this type of difficulties with a rolling bearing of the previously-mentioned type, it is therefore necessary to arrange that this bearing has a first state in which it is possible to proceed to its mounting and a second state which is different from the first state in which, when the bearing has been mounted, the latter has the features required for its normal operation. One solution is for example disclosed in the French patent application 2 628 160. However, this solution does not have the expected universality.

Indeed, it has been found that, upon assembly, the rolling elements of this bearing have a certain tendency to escape either spontaneously or under the action of the prestress of the first state, even if this prestress is substantially inactive. It has also been found in this bearing that the elastically yieldable element of the elastically yieldable device which affords the prestress is relatively complex as concerns its manufacture and its mounting and disassembly. It has also been observed that, when the means for retaining the prestress device of this bearing are formed by a detent mechanism, it is somewhat delicate to place the support for this device in position (in particular when the housing of the bearing is in the form of a relatively thin socket which has been hardened by a hardening process so that it may serve directly as a raceway for the rolling elements) and consequently this support is no longer flexible and suitably elastic.

An object of the invention is to overcome most of the briefly recalled drawbacks.

The invention provides an improved prestressed rolling bearing comprising a housing, rolling elements rolling along two circular raceways, at least one ring formed by two ring parts, on each of which ring parts one of said raceways is located, said ring parts being freely movably mounted one inside the other so as to be axially slidable, and an elastically yieldable device cooperative with said housing and at least one of said ring parts so as to axially bias said two circular raceways towards each other and exert a prestress, said rolling elements being adapted to come to bear against another ring and roll along at least one other circular raceway, said elastically yieldable prestress device being adjustable between a first state in which the prestress is substantially inactive to permit placing said rolling elements in contact with said other raceway of said other ring and a second state in which the prestress is active to permit said rolling elements, when they are in contact with said three raceways, to at least circulate with the required prestress for normal operation of the bearing.

This improved prestressed rolling bearing is preferably equipped with an elastically yieldable device which comprises a support associated with the housing and permitting the passage of said other ring, retaining means for associating said support with said housing in such manner that the support is adjustable between a first position in which the elastically yieldable device is in its first state and at least a second position in which the elastically yieldable device is in its second state, and at least one elastically yieldable element disposed between said support and one of said ring parts of said ring.

This improved prestressed rolling bearing has the feature of comprising a cage including a ring and pairs of arms carried by said cage ring on one side of said cage ring and axially oriented and provided with seats formed at least on said arms for receiving the rolling elements therein in such manner that said rolling elements are moreover movable relative to said two ring parts of said ring in particular axially and radially at least when the elastically yieldable device is in its first state.

This improved prestressed rolling bearing has the feature that its elastically yieldable device is provided with at least one elastically yieldable element having a collar shape which defines a pad for cooperation with one of said parts of said ring and a shoe for cooperation with said support, said pad and shoe being separated by a groove which is wide open when the elastically yieldable device is in its first state and is substantially closed when said elastically yieldable device is in its second state.

This improved prestressed rolling bearing has the feature that said support is a washer with a slot delimited by two preferably substantially radial edges of the washer.

Further features and advantages of the invention will be apparent from the following description and claims and the accompanying drawings given solely by way of example and in which:

FIG. 4 is a partial view of a detail of the variant shown in FIG. 3;

FIG. 5 is a view of a detail similar to that shown in FIG. 4 of the embodiment shown in FIGS. 1 and 2, and FIGS. 6 and 7 are detailed views of two variants.

Figure 1:
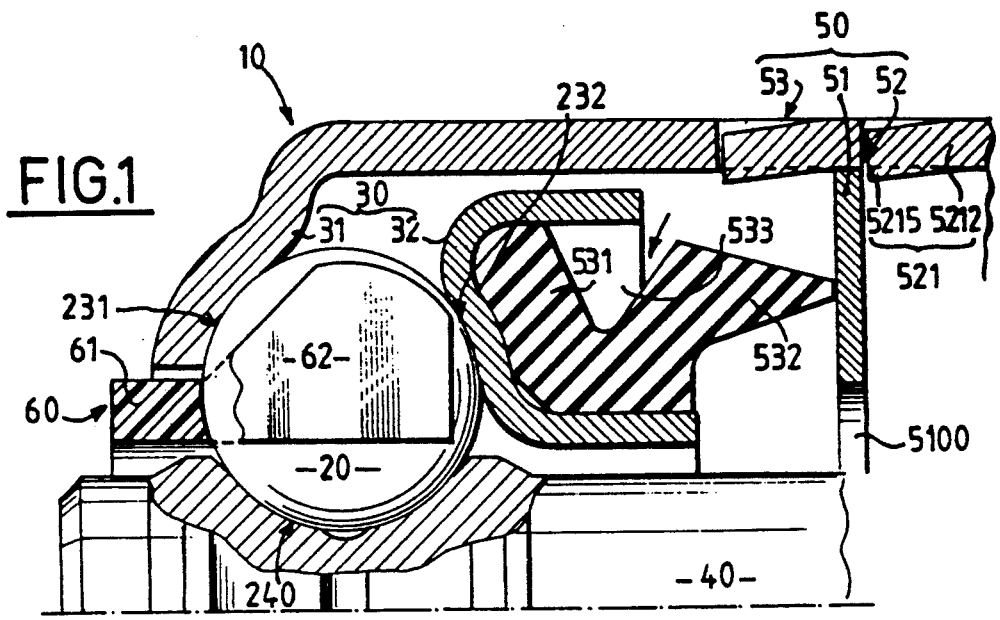
FIG. 1 is a partial meridian axial sectional view of an embodiment of the improved prestress rolling bearing according to the invention in its first state.

Prestressed rolling bearings, in particular ball bearings, are well known in the art. This is why in the following description only that which directly or indirectly concerns the invention will be described. As to the rest, one skilled in the art will benefit from existing conventional solutions for coping with particular problems which may be encountered.

Hereinafter, like reference numerals are always employed for like elements irrespective of the embodiment and variant of the invention.

For convenience of description, each of the components of an improved prestressed rolling bearing according to the invention will be described in succession before describing the mounting, the assembly and the operation thereof.

In the following description, it will be assumed that an improved prestressed rolling bearing according to the invention is intended to be employed with a shaft provided with a groove which directly serves as a bearing ring with a circular raceway. It will be clear that the invention may be easily transposed so that a rolling bearing according to the invention does not cooperate with a shaft placed axially inside the bearing but with a bore which is then located at the outer periphery of the bearing. The transpositions are easy and involve no modification departing from the scope of the invention.

An improved prestressed rolling bearing according to the invention comprises, in respect of the illustrated embodiments and variants, a housing 10, rolling elements 20, such as balls, disposed in a cage 60, a ring 30 made in two ring parts 31 and 32, and an elastically yieldable prestressing device 50 capable of assuming two states, namely a first state in which the prestress is substantially inactive so as to allow the mounting of the bearing and a second state in which the prestress is active so as to ensure that the rolling bearing according to the invention can operate normally subsequent to the mounting.

In the illustrated embodiments, the housing has preferably thin walls. The methods for manufacturing, machining and treating this type of housing are conventional.

As can be seen in respect of the illustrated and described embodiments, the housing 10 is directly associated with the ring part 31 of the ring 30. The housing 10 and the part 31 are for example made in one piece and are arranged in the form of a socket. The other ring part 32 of the ring 30 is in the form of an annular cup which is relatively freely movable in the housing or socket so as to be axially slidable therein with no risk of becoming jammed or blocked.

The rolling elements 20, here balls, are adapted to bear against at least each of the ring parts 31 and 32 in circular raceways 231 and 232 respectively.

These rolling elements 20 are also adapted to circulate on at least one other raceway of another bearing ring. In the illustrated embodiments, this other bearing ring 40 is formed by a shaft which defines another raceway 240 around which the rolling elements are disposed. This raceway 240 is for example defined by a groove having a meridian cross-section in the shape of an arc of a circle in the bottom of which is provided a channel 242 and which is bordered by shoulders 243. The free end of the shaft 40 is preferably provided with a bevel or chamfer 241 for reasons which will be explained hereinafter.

The elastically yieldable prestressing device 50 provided for the improved prestressed rolling bearing according to the invention is adjustable between two states: a first state in which the prestress is substantially inactive so as to permit the mounting of the bearing, here the mounting of the shaft 40 in the bearing, and a second state in which the prestress is active so as to permit a normal operation of the bearing with the prestress required for correct operation subsequent to the mounting of the bearing. The adjustable elastically yieldable prestressing device comprises a support 51, retaining means 52 and an elastically yieldable means or element 53.

The support 51 is in the form of a washer 5100 with a slot 5101 delimited by two substantially radial edges 5102 of the washer. As is clear in FIG. 6, this washer is planar and its two edges are substantially coplanar and located in facing relation to each other with a clearance 5103. The function of this clearance will be explained hereinafter. In the variant illustrated in FIG. 7, the washer is not planar but twisted and its two edges 5102 are not coplanar. In this way, as the edges are no longer in facing relation to each other, they can overlap each other without meeting when there is a tendency to move them towards each other for the reasons explained hereinafter. This provides a clearance.

Figure 2:
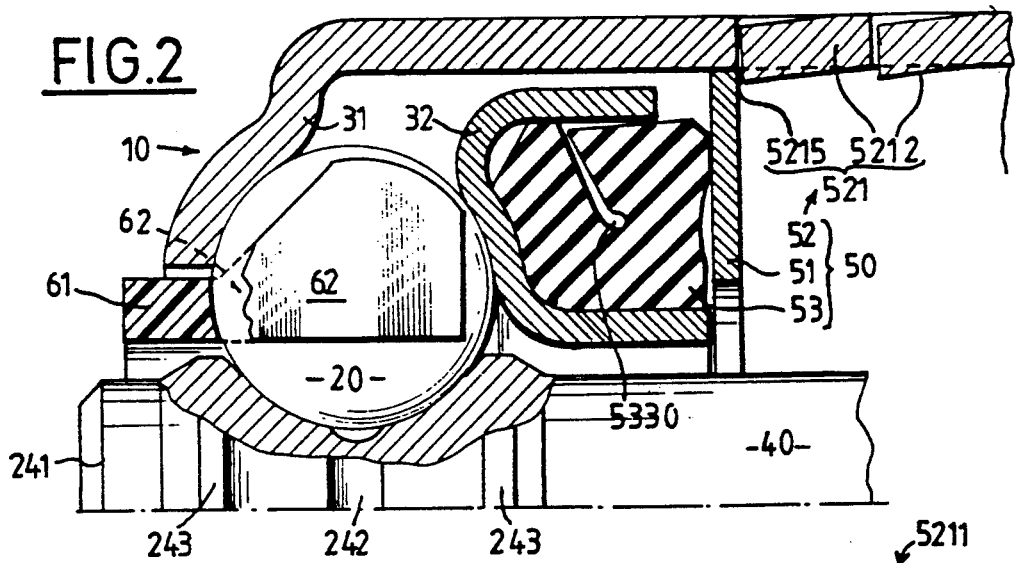
FIG. 2 is a view similar to FIG. 1 in which the bearing is shown in its second state.
Figure 3:
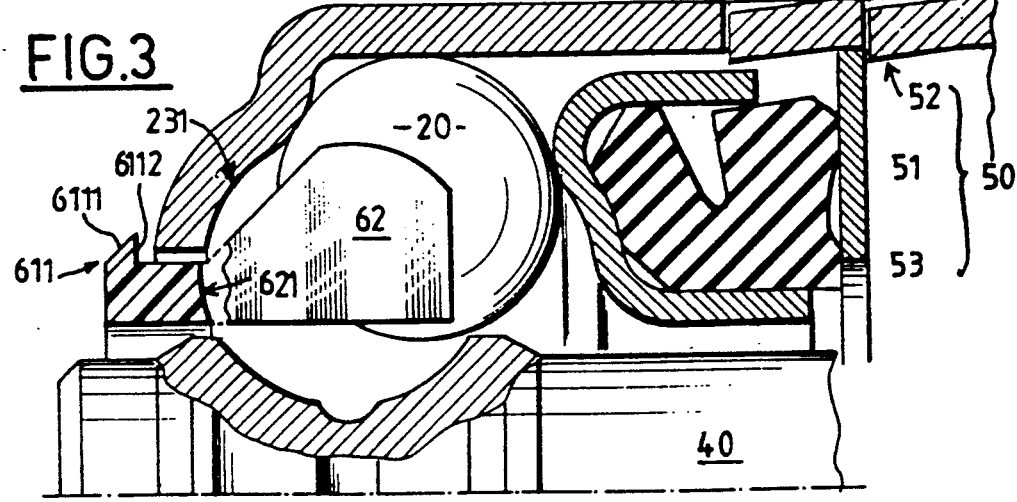
FIG. 3 is a view similar to FIG. 1 of a variant in which the rolling bearing is in an intermediate state it passes through when it is assembled.

The retaining means 52 are adapted to hold the support 51 in position relative to the housing 10. These retaining means allow the elastically yieldable prestressing device to assume either one of its two states. These retaining means comprise a detent mechanism 521. This detent mechanism comprises at least two successive abutments 5211 such as lugs 5212 and an edge 5215 of the washer 5100, as shown in FIGS. 1, 2 and 3. The lugs 5212 are for example obtained by a press operation on the socket 10 with or without shearing the latter, so that the lugs project radially into the interior of the housing 10 to an extent which increases as one moves axially from the outer end of the socket to the inner end of the latter. These lugs are for example evenly spaced apart on successive circles and the lugs of two successive circles are either in a common meridian plane as shown in FIGS. 1, 2 and 3, or in meridian planes which are angularly staggered so as to avoid alignment with one another. As can be clearly seen in FIGS. 1 and 2 in particular, the elastically yieldable element 53 has a collar shape and defines a pad 531 which is cooperative with the axially movable ring part 32 of the ring 30, and a shoe 532 cooperative with the support 51 in the form of a washer 5100. The pad 531 and the shoe 532 are separated by a groove 533. As can be see in FIG. 1, when the prestressing device is in its first state, the groove 533 is wide open. On the other hand, when the prestressing device is in its second state illustrated in FIG. 2, the groove 533 is substantially closed as shown. An interstice 5330 is shown merely for convenience of the illustration and the following description.

As can be seen, the cage 60 comprises a cage ring 61 and pairs of arms 62 carried by the cage ring on at least one side of the latter; only one pair of arms has been illustrated, but it will be clear that such pairs are arranged all around the ring and preferably evenly spaced apart. These axially oriented arms 62 are so arranged as to form on at least the arms seats 621 having preferably a spherical dome shape for receiving the rolling elements 20. These seats are so arranged that the rolling elements 20 are movable relative to the ring parts 31 and 32 of the ring 30 in particular axially and radially in addition to their natural motion when the rolling bearing according to the invention is in normal operation. In the embodiment illustrated in FIGS. 1, 2 and 5, the arms 62 form jaws 622 and the cage 60 is mounted to be movable between the rings 30 and 40. Consequently, the arms are so arranged that they only allow the rolling elements 20 to move substantially solely radially for leaving their seats. In the variant shown in FIGS. 3 and 4, the cage ring 61 is provided with a lip portion 611 defining a slope 6111 and a stop 6112. The slope enables the cage to be placed in position by elastic deformation and the stop axially immobilizes the cage relative to the rings between which it is placed. As is particularly clear in FIGS. 3 and 4, the rolling elements bear against their respective seats between the arms in such manner that they are axially and radially movable for the purpose of leaving their seats.

In the initial position, a rolling bearing according to the invention is in the situation illustrated in FIG. 1 or FIG. 3. In this situation, the elastically yieldable prestressing device is in its first state. If the other ring 40 is then placed in position, the prestressing device is put into an intermediate state illustrated in FIG. 3. The rolling elements or balls, initially retained in the cage between the arms and bearing against their respective seats, are temporarily urged radially outwardly, the chamfer facilitating the introduction and the positioning of the shaft 40 in opposition to the prestress force exerted by the elastically yieldable element. Thereafter, the balls come to engage and rest in the groove forming the raceway 240 in the shaft and resume their initial position under the effect of the elastically yieldable element which urges them back to this position.

Owing to the configuration of the cage, it will be understood that the balls were free to move both radially and axially to permit the introduction and the positioning of the shaft 40.

In order to shift the elastically yieldable prestressing device from its first state shown in FIGS. 1 or 3 to its second state shown in FIG. 2, it is sufficient to act on the support 51 so that its edge rests no longer against the axially outermost lug 5212 but against the following lug, as illustrated. As mentioned for the reasons already explained, the lugs 5212 are neither sufficiently flexible nor sufficiently elastic to allow this change in the state of the prestressing device owing to the treatments undergone by the socket. It is therefore the washer 5100 which has this elasticity. When the washer is urged by means of any suitable tool toward the rolling elements with sufficient force, the slope of the lugs tends to cause the edges of the slot of the washer to move towards each other. If the edges are spaced apart by a sufficient clearance 5103 as shown in FIG. 6, they will be able to move towards each other under the action of the lugs without touching. If this is not the case and the clearance is insufficient and the washer is distorted as illustrated in FIG. 7, the edges will avoid each other while moving towards each other, since they are in different planes and this will allow the washer to travel axially beyond the lugs. When the washer has passed beyond the lugs, the inherent elasticity of the washer will cause it to resume its initial configuration in which it occupies the whole of the inside diameter of the socket or housing while being supported axially against the lugs by the outer peripheral edge portion of the washer.

In the position of the improved rolling bearing according to the invention illustrated in FIG. 1, the elastically yieldable element 50 exerts substantially only a small axial force on the support 51 through the medium of its shoe 532. When the support is urged back and moved to the position illustrated in FIG. 2, the shoe 532 is deformed and compressed and comes into contact with the pad 531 and causes the groove 533, which was initially wide open, to substantially disappear. It will be observed that the initial volume of the shoe is such that, when it occupies its second state illustrated in FIG. 2, it occupies substantially the whole of the space initially left free inside the movable ring part and the socket and delimited by the support 51.

The choice of the material from which the elastically yieldable element is made and the volume the shoe must fill permit adjusting the value of the prestress required for correct bearing operation. To achieve this, it is sufficient to arrange that the distance between the two positions of the washer is greater than the distance between the position of the movable part of the bearing ring (FIG. 3) for mounting the bearing and the position it occupies for bearing operation (FIG. 2).

Preferably, the housing is composed of metal, the cage of synthetic material and the elastically yieldable element of an elastomer.

The advantages of the improved prestressed rolling bearing according to the invention will therefore be understood.

What is claimed is:

1. Prestressed rolling bearing comprising, a housing, a bearing ring comprising two ring parts, a circular raceway provided on each of said ring parts, rolling elements in contact with said raceways for circulating around said raceways, said ring parts being disposed coaxial and freely movably mounted one inside the other axially slidable, an elastically yieldable prestressing device cooperative with said housing and at least one of said ring parts to axially bias said two ring parts and the respective circular raceways axially towards each other and exert a prestress, another bearing ring defining one other circular raceway, said rolling elements being disposed to bear against another bearing ring and circulate along said one other circular raceway in use of said rolling bearing, said elastically yieldable prestressing device being adjustable between a first state in which the prestress is substantially inactive to permit placing said rolling elements in contact with said other raceway of said another bearing ring and a second state in which the prestress is active to permit said rolling elements, when they are placed in contact with all said raceways, to circulate with the required prestress for normal operation of the rolling bearing, said rolling bearing comprising a cage having a cage ring, pairs of arms on one side of said cage ring axially oriented and having seats formed for receiving said rolling elements therein so that said rolling elements are movable relative to said two ring parts axially and radially when said elastically yieldable device is in said first state, said cage being mounted axially movable between said rings, the arms of said pairs of arms defining jaws which allow said rolling elements to move substantially only radially for leaving said seats, said cage ring having a lip portion for cooperation with one of said ring parts to axially immobilize the cage relative to said rings and between said rings, said arms being configured to allow said rolling elements to move axially and radially for leaving said seats, said lip portion having a slope for placing said lip portion in position relative to that one of said ring parts with which said cage is cooperative, and a stop defined by said lip for fixing the axial position of said cage relative to said rings.

2. Prestressed rolling bearing comprising a housing, at least one bearing ring comprising two ring parts, a raceway provided on each of said ring parts, said rolling elements being in contact with said raceways for circulating round said raceways, said ring parts being coaxial and freely movably mounted one inside the other so as to be axially slidable, and an elastically yieldable prestressing device cooperative with said housing and at least one of said ring parts so as to axially bias said ring parts and the respective two circular raceways towards each other and exert a prestress, said rolling elements being adapted to bear against another ring and circulate along at least one other circular raceway in use of the rolling bearing, said elastically yieldable prestressing device being adjustable between a first state in which the prestress is substantially inactive to permit placing said rolling elements in contact with said at least one other raceway of said other ring and a second state in which the prestress is active to permit said rolling elements, when they are placed in contact with said three raceways, to at least circulate with the required prestress for normal operation of the rolling bearing, said elastically yieldable prestressing device comprising a support, retaining means and at least one elastically yieldable element, said at least one elastically yieldable element having a configuration of a collar and defining a pad cooperative with one of said ring parts and a shoe cooperative with said support, a groove separating said pad and said shoe and being wide open when said elastically yieldable device is in said first state and substantially closed when said elastically yieldable device is in said second state.

3. Rolling bearing according to claim 2, wherein said at least one elastically yieldable element is composed of an elastomer.

4. Prestressed rolling bearing comprising a housing, at least one bearing ring comprising two ring parts, a raceway provided on each of said ring parts, said rolling elements being in contact with said raceways for circulating round said raceways, said ring parts being coaxial and freely movably mounted one inside the other so as to be axially slidable, and an elastically yieldable prestressing device cooperative with said housing and at least one of said ring parts so as to axially bias said ring parts and the respective two circular raceways towards each other and exert a prestress, said rolling elements being adapted to come to bear against another bearing ring and circulate along at least one other circular raceway in use of the rolling bearing, said elastically yieldable prestressing device being adjustable between a first state in which the prestress is substantially inactive to permit placing said rolling elements in contact with said at least one other raceway of said other bearing ring and a second state in which the prestress is active to permit said rolling elements, when they are placed in contact with said three raceways, to at least circulate with the required prestress for normal operation of the rolling bearing, said elastically yieldable device comprising a support, retaining means and at least one elastically yieldable element, said support being a washer with a slot delimited by two approximately radial edges of the washer.

5. Rolling element according to claim 4, wherein said two edges are coplanar.

6. Rolling bearing according to claim 4, wherein said two edges are not coplanar.

7. Rolling bearing according to claim 4, wherein said retaining means comprise a detent mechanism associated with an edge of said washer and at least two lugs which are combined with said housing and at least partly project into the inside of said housing.

* * * * *